Patented June 17, 1941

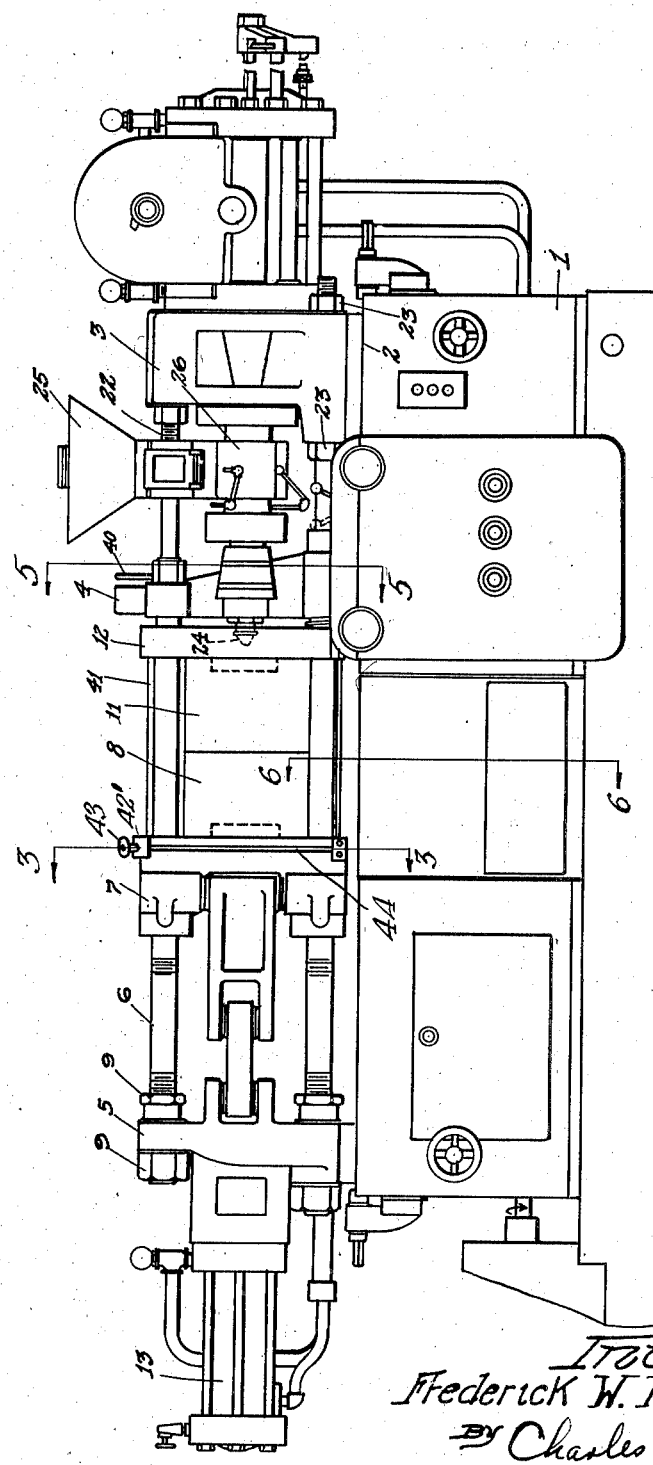

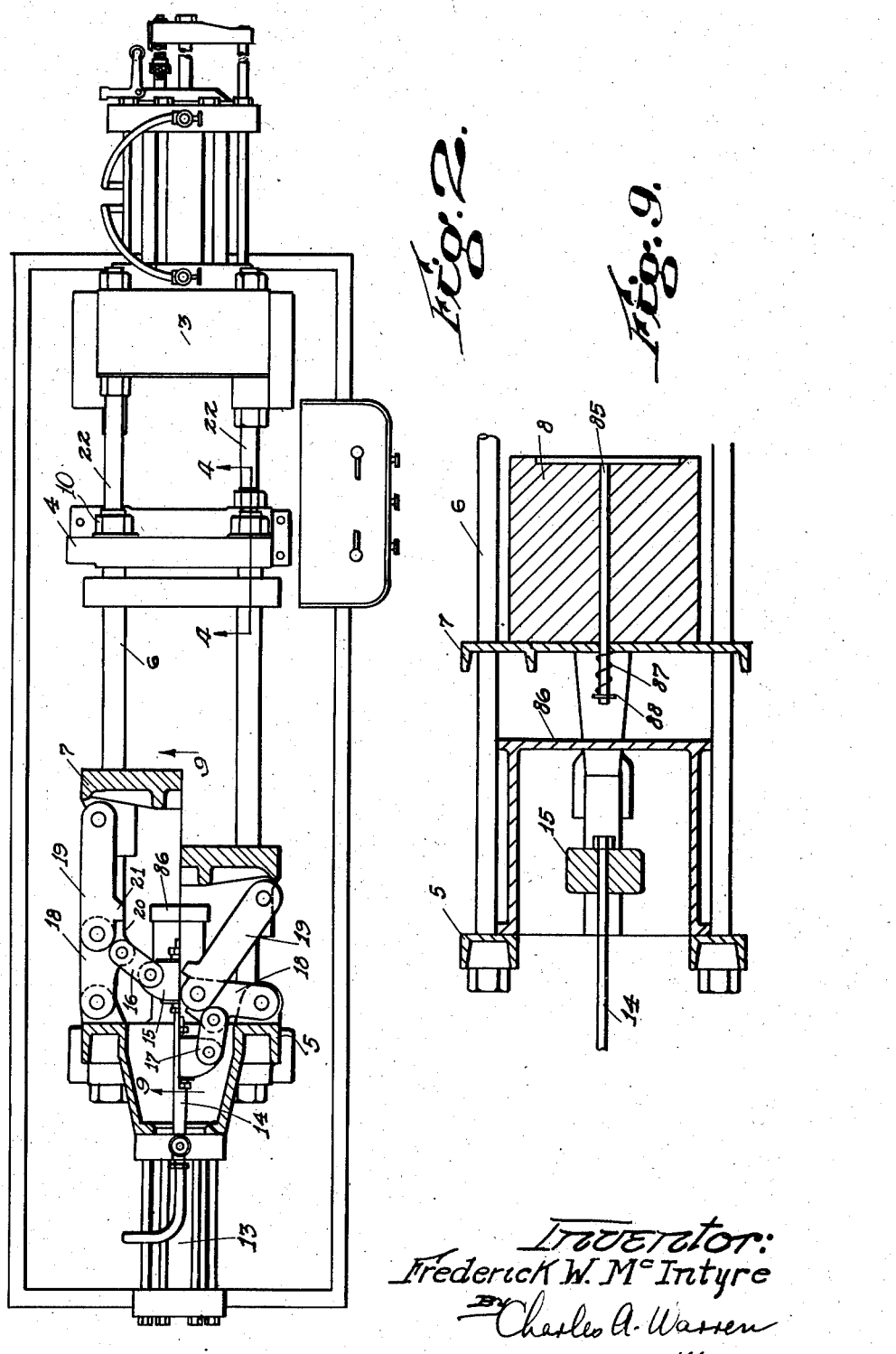

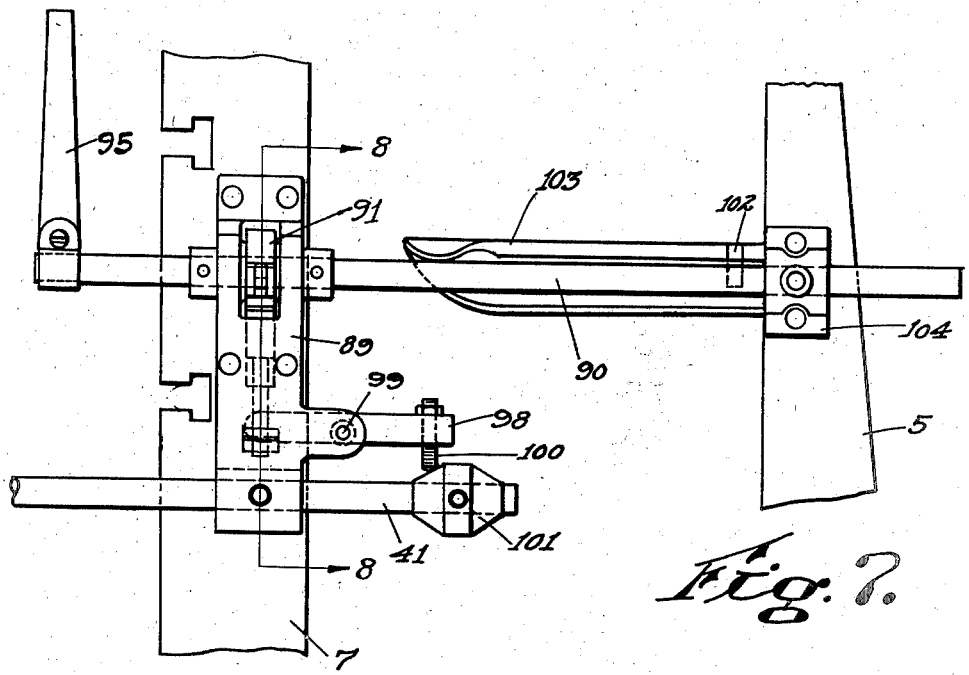
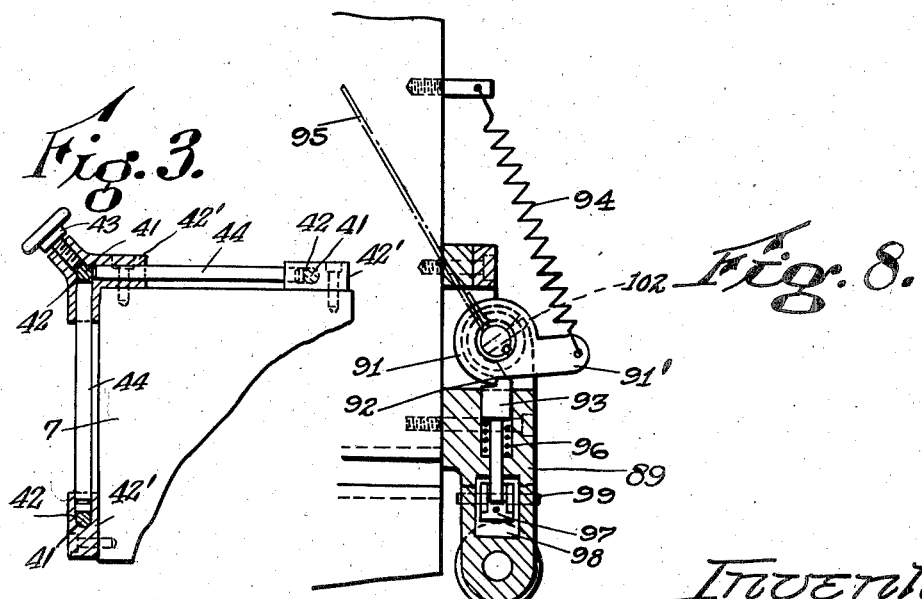

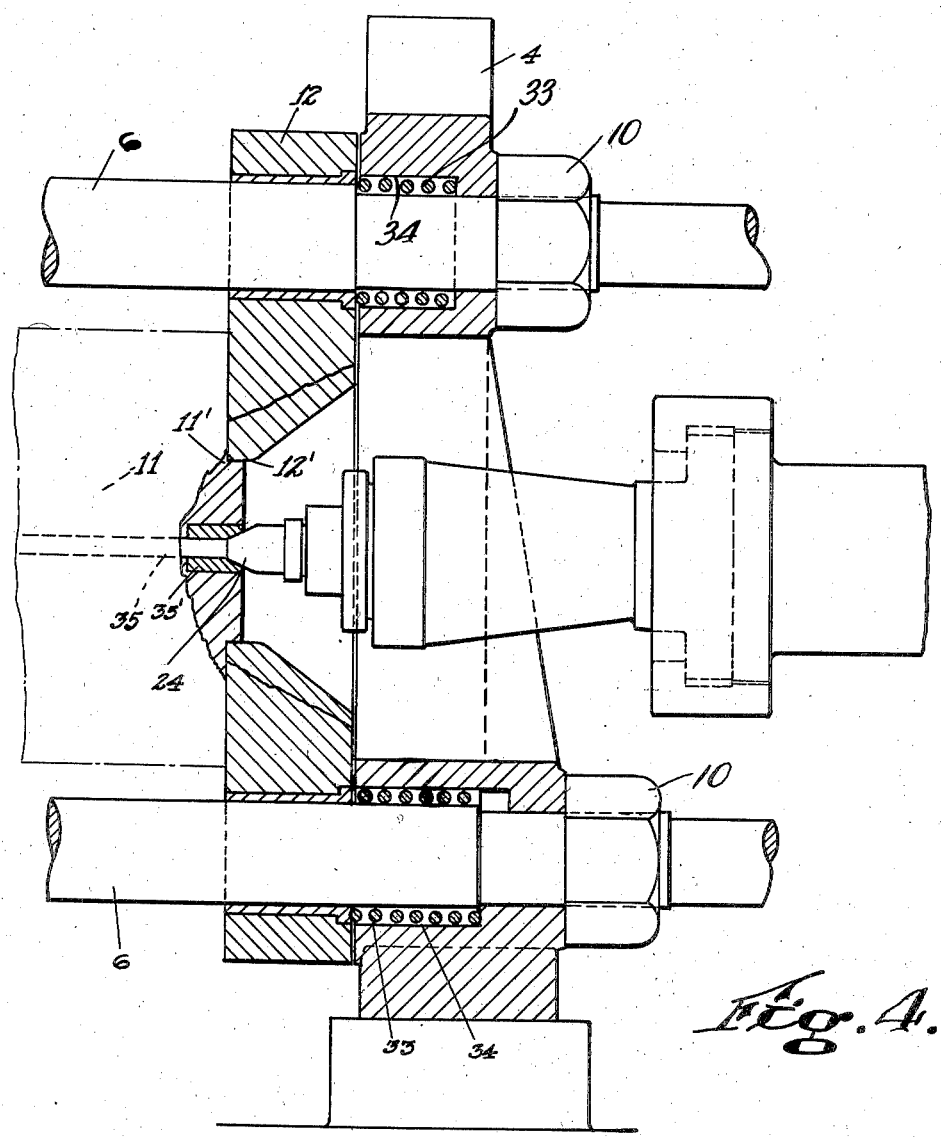
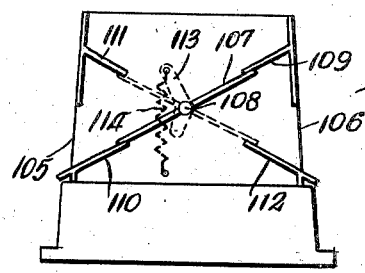

2,246,414

UNITED STATES PATENT OFFICE 2,246,414

PLASTIC MOLDING MACHINE

Frederick W. McIntyre, Worcester, Mass., assignor to Reed-Prentice Corporation, Worcester, Mass., a corporation of Massachusetts Application October 14, 1937, Serial No. 168,987

3 Claims. (Cl. 18—30)

The present invention relates to a plastic molding machine of the type in which heat plasticized material is injected under pressure into suitable dies carried by relatively movable plates. After each molding operation, the die carrying plates are separated to permit ejection of the molded article.

In the usual arrangement of molding machines of this character one of the plates carrying a portion of the die surrounds the end of the nozzle by which the injection is effected and remains substantially in that position during the operation of the machine. One feature of the present invention resides in the provision for quick removal of this plate when it is desirable to reach the end of the nozzle, as for cleaning the nozzle, replacement thereof, or for other purposes.

A further feature of the invention resides in the provision of a guide plate so positioned within the base of the machine that the molded articles as discharged from the mold may be directed selectively to the back or front of the machine. In this way, it is unnecessary for the operator to remove the articles manually from within the base.

Other and further objects and advantages of the invention will more fully appear from the following detailed description taken in connection with the accompanying drawings in which—

Fig. 1 is a front elevation of a machine embodying the invention.

Fig. 2 is a plan view of the machine of Fig. 1 with parts in section.

Fig. 3 is a sectional view along the line 3—3 of Fig. 1.

Fig. 4 is a fragmentary sectional view along the line 4—4 of Fig. 2.

Fig. 6 is a sectional view along the line 6—6 of Fig. 1.

Fig. 7 is a rear elevation of a part of the ejecting mechanism.

Fig. 8 is a sectional view along the line 8—8 of Fig. 1.

Fig. 9 is a sectional view along the line 9—9 of Fig. 2.

Like reference characters refer to like parts in the different figures.

Figure 5:
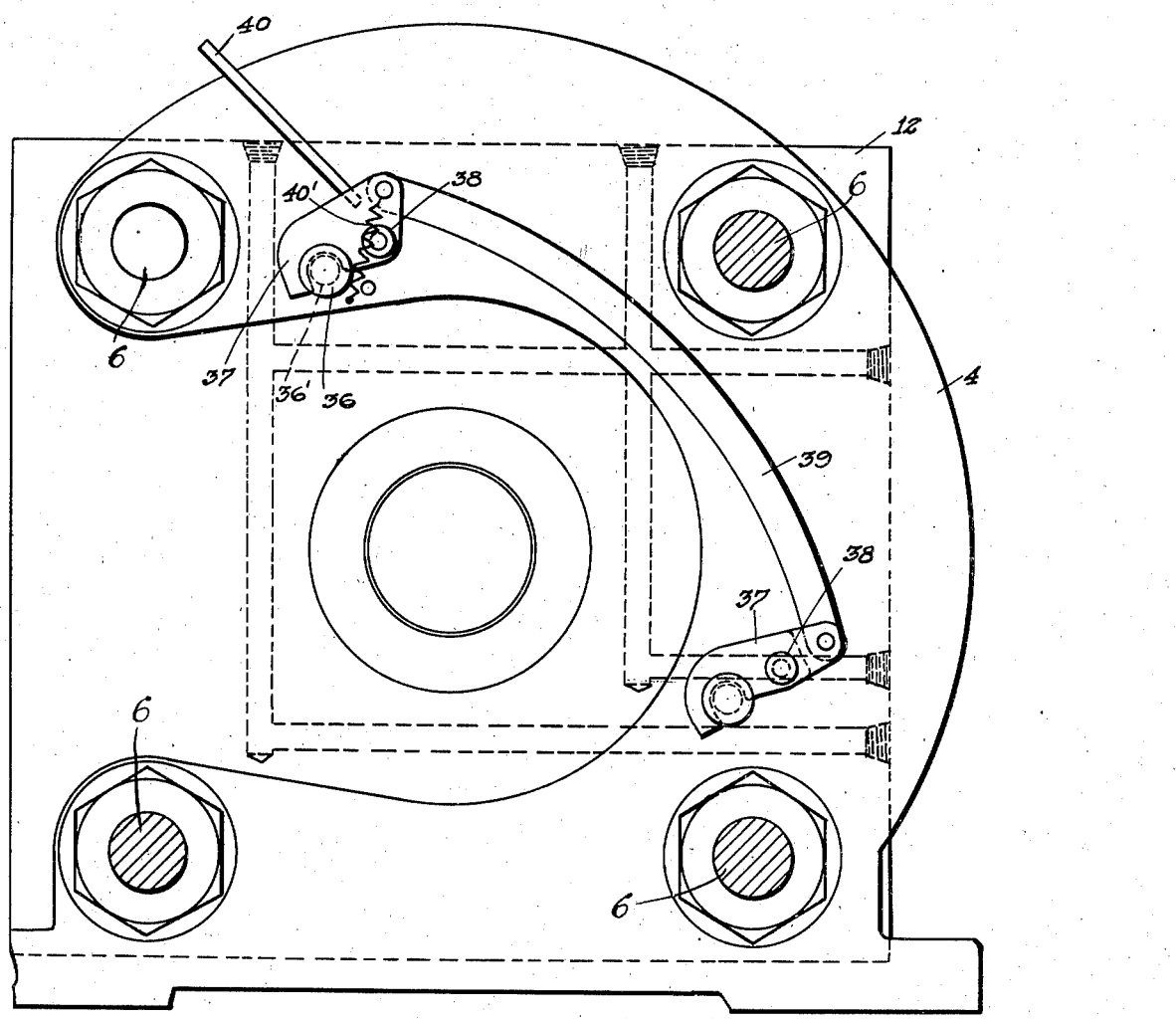
Fig. 5 is a sectional view along the line 5—5 of Fig. 1.

With reference to Fig. 1, the machine comprises a base 1 having guideways 2 on which is positioned a head 3 at the right hand end of the machine. Spaced from the head 3 is a supporting block 4, also mounted for adjustment longitudinally of the machine on the ways 2. At the left hand end of the base is a head 5 movable on the ways 2 and normally locked against movement thereon. Extending between the head 5 and the block 4 are four large diameter bars 6 (see Fig. 5), which provide guideways for a slidable member 7 on which the movable die 8 is mounted. The bars are mounted against longitudinal movement in the head 5 by suitable clamping nuts 9 on the threaded end thereof, and locking nuts 10 hold the bars in position within the block 4. The stationary die 11 is carried by a plate 12 normally held in a position adjacent to the block 4 and arranged for sliding movement on the bars 6.

To bring the dies 8 and 11 together the member 7 is moved longitudinally on the bars 6 by any suitable means, as by a fluid pressure actuated mechanism. With reference to Fig. 2, the head 5 has mounted thereon a cylinder 13 having a piston, not shown, therein, connected to a projecting piston rod 14. The projecting end of the piston rod has a collar 15 to which are pivotally connected short links 16 and 17. Two toggle linkages, each made up of a pair of links 18 and 19, the former being pivotally connected to the head 5, and the latter being connected to the member 7, are connected to the links 16 and 17 and provide for movement of the member 7 toward or away from the plate 12. Cooperating lugs 20 and 21 on the links 18 and 19 limit the movement of the links beyond the straight line position shown in the upper part of Fig. 2, with the member 7 in its right hand position. By this arrangement it will be clear that the movement of the piston within the cylinder 13 procures movement of the member 7 to the right into a position for the molding operation and subsequently a movement of the member 7 to the left (into the position shown in the lower part of Fig. 2) for separating the portions of the mold.

Since the links 18 and 19 are moved into a straight line position when the member 7 reaches the right hand position shown, it will be apparent that the dies 8 ad 11 are held against movement away from each other by mechanical elements independently of the fluid pressure in the cylinder 13, since the toggle linkage cannot be moved out of its straight line position without an inward pull exerted by the links 16 and 17.

The head 3 and block 4 are held in predetermined relation to each other by bars 22 which are integral extensions of the bars 6 and are held against movement in the head 3 by locking nuts 23. Between the head 3 and the block 4 are positioned the nozzle 24 mounted on a heating chamber 75 in which the material being molded is plasticized, a hopper 25, and the feeding and measuring mechanism 26, of any suitable character.

The plate 12 which carries the stationary die 11 is movable on the bars 6 toward and away from the end of the nozzle 24. To this end a coil spring 33, Fig. 4, is positioned around each of the bars 6 between the block 4 and the plate 12, these springs engaging in annular recesses 34 provided by the block 4. As the movable member 7 on which the die 8 is mounted is brought toward the plate 12 the latter is urged to the right, Fig. 1, against the resistance of the springs 33 until the nozzle 24 is tightly seated against the end of a bore 35 provided in the die 11, this bore providing for the flow of the plasticized material from the nozzle into the mold cavity. As the dies are separated at the completion of the molding operation, the plate 12 is moved away from the block 4 by the then compressed springs 33, thereby breaking away the plastic material at the end of the nozzle.

To assure a tight fit between the nozzle 24 and the end of the bore 35, the die 11 in which the bore 35 is located has a projecting annular hub 11' engaging in a centrally located bore 12' in the plate 12 to center the die. A hardened steel bushing 35' is inserted in the end of the bore 35 and is shaped to correspond to the tip of the nozzle so that no leakage of the plastic material may occur around the end of the nozzle.

The movement of the member 12 to the left, Fig. 1, is limited by projecting pins 36, Fig. 5, mounted in the member 12 and extending horizontally through bores in the block 4. The outer ends of the pins have annular grooves 36' therein for engagement by latches 37 pivotally mounted on studs 38 on the block 4. A link 39 provides a connection between the latches, and a handle 40 provides for movement of the latches in unison so that the latches may all be released simultaneously to allow an extended movement of the member 12 to the left for removing said member from its normal position adjacent to the nozzle. A coil spring 40' is connected from one of the latches 37 to the block 4, with the pivotal support for the latch located between the ends of the spring. Thus, in accordance with the position of the handle 40, the latches are held resiliently in the operative position shown or in an unlatched position, as will be apparent.

To facilitate the extended movement of the member 12 a plurality of rods 41, as shown in Fig. 3 are carried by said member and extend to the left through bores 42 in brackets 42' on the member 7. During the normal movement of the member 7 the rods 41 slide within the member 7 without affecting the movement of the plate 12. Each of the rods 41, however, may be held against movement relative to the member 7 by a suitable clamping screw 43 which, by engaging one of the rods 41 urges thrust rods 44 into clamping engagement with the rods 41. If the rods 41 are clamped when the member 7 is in its right hand position, the plate 12 will move with the member 7 when the latter is subsequently moved to the left, thereby permitting access to the nozzle and to the recess in the right hand side of the plate 12 which makes possible cleaning of the nozzle when necessary.

The plastic material is fed into the nozzle and discharged from the nozzle into the mold by any suitable means which may be hydraulic pressure. This feeding mechanism may be of any suitable character, such, for example, as described in my copending divisional application, Serial No. 379,157, filed February 17, 1941. For purposes of the present application it is sufficient to note that granular or powdered material from the hopper 51 is suitably heated in the heating chamber 75, Fig. 1, to the end of which the nozzle 24 is connected, and is subsequently discharged through the nozzle into the mold.

The molded articles are ejected from the mold cavities when the die elements are separated. To this end the movable die may have a pin 85 axially slidable therethrough, as shown in Fig. 9, in a position to engage a part of the molded article. As the movable die 8 is moved to the left, Fig. 1, the projecting end of the pin 85 engages with a plate 86 (see also Fig. 2,) secured to the head 5, which causes movement of the pin within the die to force the molded article away from the die 8. The pin is normally urged to the left, Fig. 9, relative to the die 8, by a spring 87 surrounding the pin and engaging a collar 88 thereon.

There is a provision for discharge of the molded articles from between the dies when the latter are moved apart at the completion of the molding operation and when the articles are pushed out of the die 8 by the pin 85. With reference to Figs. 7 and 8, the member 7 has mounted on the back thereof a bracket 89, in which is journalled a shaft 90. A collar 91 on the shaft has a projecting shoulder 92 for engagement with a spring-pressed latch 93, slidable in the bracket. The latch normally prevents counterclockwise (Fig. 8) movement of the shaft 90, under the influence of a coil spring 94 connected to a lug 91' on the collar. The end of the shaft 90 has mounted thereon a projecting arm 95, preferably of resilient material, which is adapted to swing downwardly between the stationary and movable dies, as the latter are moved apart for discharging the molded articles. The arm is swung upwardly during the movement of the dies together, in readiness for the subsequent molding operation.

As best shown in Fig. 8, the latch 93 is movable vertically in the bracket 89, and is normally urged upward into operative position by a coil spring 96. The lower end of the latch 93 has a collar 97 mounted thereon in a position for engagement with the bifurcated end of a lever 98 pivoted centrally on a pin 99 in the bracket 89. The outer end of the lever 98 carries a vertically extending stud 100 which, during the movement of the member 7 in a direction to separate the stationary and movable dies, engages a tapered collar 101 on one of the rods 41. Since the rod 41 is permanently secured in the plate 12, the member 7 moves relative to the rod, and thus as the member reaches the end of its movement toward open position, the stud 100 engages the collar and is rocked thereby to release the latch 93 and allow the projecting arm to swing downwardly between the stationary and movable dies. It will be noted that the arm 95 is preferably adjustable longitudinally on the rod 90, so that the arm may be positioned to swing between the dies, when one type of die is substituted for another.

It will be noted in this connection, that when the clamping screw 42 is tightened to cause movement of the plate 12 with the member 7, the rod 41 also moves with the member 7, so that the latch 93 is not released, and the ejecting arm stays in the raised position. There is, as a result, no possibility of the damaging of the arm 95 or its associated mechanism, by engagement with the stationary die or the plate 12 when the plate 12 is moved with the member 7.

The ejecting arm 95 is automatically returned to its raised position when the member 7 moves into a position to close the dies. To this end, as shown in Fig. 7, the shaft 90 has a projecting pin 102 in a position for engagement with a cam surface 103 on a bracket 104 secured to the head 5, relative to which the member 7 is moved. The bracket 104 is positioned to allow free turning movement of the shaft 90, when the member 7 reaches the end of its movement toward the open position of the dies, but the cam provides for rocking movement of the shaft to raise the ejector arm, when the member 7 begins its movement into a position to close the dies, this movement being toward the left, Fig. 7.

With reference to Fig. 6, the base 1 has an opening 105 in the front wall thereof and a similar opening 106 in the rear wall for the discharge of workpieces selectively to the front or to the rear of the machine. Positioned within the base is a plate 107 mounted on a rod 108 and adapted to assume either the full line position of Fig. 6 in engagement with projecting ribs 109 and 110 provided by the base for discharging molded articles to the front of the machine, or the dotted line position of Fig. 6 in engagement with similar ribs 111 and 112 for the discharge of molded articles toward the rear of the machine. The rod 108 has secured thereto a projecting arm 113 extending at right angles to the plate, and a coil spring 114 is connected to the end of the arm and to the base, with the end of the rod between the ends of the spring. The plate 107 is thus held resiliently in either of the positions shown without manually controlled fastening means.

Although the operation of the machine will be entirely apparent from the foregoing description, the movements of the several elements will be outlined for a more complete understanding of the invention. With the member 7 in its left hand position, as shown in Fig. 2, the machine operation is started by movement of the member 7 to the right to bring the die elements 8 and 11 into engagement. The injection plunger forces material from the heating chamber through the nozzle and into the mold cavity between the dies. Prior to the injection of material the plate 12 has been moved slightly to the right against the action of the coil springs 33 so that the end of the nozzle engages with the bushing 35' in the die element 11.

The material in the mold cavity having been given an opportunity to solidify, the member 7 is moved to the left to separate the die elements. The plate 12 moves slightly to the left as the die element 8 moves to the left and the material in the bore 35 in the die element 11 is broken off at the end of the nozzle, the latter being the portion of smallest diameter between the heating chamber and the molding cavity. As the member 7 reaches its extreme left hand position the molded article is ejected from the mold cavity in the die element 8 by the ejector mechanism above described and the discharging arm 95 then swings downwardly between the die elements for discharging the molded article into the opening in the base directly beneath the die elements.

If for any reason it is necessary to obtain access to the nozzle 24, the member 7 is moved to the right until the dies are in engagement, the clamping screw 43 is tightened, the handle 40 is rocked to shift the latches 37 to inoperative position. When the member 7 is subsequently moved to the left the plate 12 moves therewith and it is then possible to replace the nozzle or to do whatever is required.

From the foregoing it will be apparent that the present invention provides a means for ejecting the molded material from the mold cavity in the dies and additional mechanism for positively removing the molded article from between the die elements. The base of the machine incorporates structure by which the molded articles may be directed selectively to the front or the rear of the machine.

I claim,

1. In a molding machine for thermoplastics, a nozzle, an inner die having a movement toward and away from the nozzle, an outer die movable away and toward the inner die for opening and closing the mold cavity, means for limiting the movement of the inner die, means for securing the inner and outer dies together for movement of both dies toward or away from the nozzle as a unit, and latch means for rendering said limiting means inoperative.

2. In a plastic molding machine, cooperating die elements, means for procuring movement of one of said elements for separating said elements, an ejector, means responsive to movement of the movable element for procuring operation of the ejector, means for locking the die elements together for movement of both elements in response to the above mentioned means for moving one of said elements, and means for preventing operation of the ejector when the die elements are locked together.

3. In a plastic molding machine, a base having opposed openings on opposite sides thereof, cooperating die elements positioned above the base and arranged to discharge molded articles from the elements into the base when the elements are separated, a pivotally mounted plate positioned below the die elements, means for pivotally supporting the plate for swinging movement within the base and means for resiliently holding the plate selectively in a position for guiding the molded articles to either of the opposed base openings.

FREDERICK W. McINTYRE.